(12) United States Patent
O'Bryan et al.

(10) Patent No.: US 8,728,566 B2
(45) Date of Patent: May 20, 2014

(54) METHOD OF MAKING CARBON NANOTUBE COMPOSITE MATERIALS

(75) Inventors: Gregory O'Bryan, Livermore, CA (US);
Jack L. Skinner, Brentwood, CA (US);
Andrew Vance, Livermore, CA (US);
Elaine Lai Yang, Dublin, CA (US);
Thomas Zifer, Manteca, CA (US)

(73) Assignee: Sandia Corporation, Albuquerque, NM (US)

( * ) Notice: Subject to any disclaimer, the term of this patent is extended or adjusted under 35 U.S.C. 154(b) by 146 days.

(21) Appl. No.: 13/223,726

(22) Filed: Sep. 1, 2011

(65) Prior Publication Data
US 2012/0114841 A1 May 10, 2012

Related U.S. Application Data

(60) Provisional application No. 61/411,308, filed on Nov. 8, 2010.

(51) Int. Cl.
 *B05D 5/12* (2006.01)
 *B05D 7/24* (2006.01)

(52) U.S. Cl.
 USPC ....... 427/58; 427/240; 427/372.2; 427/427.4; 427/429; 427/430.1; 977/932

(58) Field of Classification Search
 USPC .......... 427/240, 58, 372.2, 427.4, 429, 430.1; 977/932
 See application file for complete search history.

(56) References Cited

U.S. PATENT DOCUMENTS

| 2003/0111646 A1* | 6/2003 | Niu et al. ................. 252/500 |
| 2006/0166003 A1* | 7/2006 | Khabashesku et al. ....... 428/413 |
| 2007/0098886 A1* | 5/2007 | Dai et al. ................. 427/202 |
| 2012/0029162 A1* | 2/2012 | Vogel et al. .............. 528/76 |

FOREIGN PATENT DOCUMENTS

WO   WO 2010/115550 A1 * 10/2010

OTHER PUBLICATIONS

O'Bryan, G., et al., Nanotube Surface Functionalization Effects in Blended Multiwalled Carbon Nanotube/PVDF Composites, J. of Appl. Polym. Sci., vol. 120 (2011) pp. 1379-1384.
Baughman, R.H. et al., Carbon Nanotubes—The Route Toward Applications, Science, vol. 297 (2002) pp. 787-792.
Bose, S., et al., Assessing the Strengths and Weaknesses of Various Types of Pre-Treatments of Carbon Nanotubes, etc. Polymer, 51 (2010) pp. 975-993.
O'Connell, et al., Reversible Water-Solubilization of Single-Walled Carbon Nanotubes by Polymer Wrapping, Chemical Physical Letters, 342 (2001) pp. 265-271.
Sun, et al., Modeling of the Electrical Percolation of Mixed Carbon Fillers in Polymer-Based Composites, Macromolecules, 42 (2009) pp. 459-463.
Spitalksy, et al., Effect of Oxidation Treatment of Multiwalled Carbon Nanotubes on the Mechanical and Electricla Properties, etc., Composites: Part A, 40 (2009) pp. 778-783.

* cited by examiner

*Primary Examiner* — Kristen Jolley
(74) *Attorney, Agent, or Firm* — Elmer A. Klaveller

(57) ABSTRACT

The present invention is a method of making a composite polymeric material by dissolving a vinyl thermoplastic polymer, un-functionalized carbon nanotubes and hydroxylated carbon nanotubes and optionally additives in a solvent to make a solution and removing at least a portion of the solvent after casting onto a substrate to make thin films. The material has enhanced conductivity properties due to the blending of the un-functionalized and hydroxylated carbon nanotubes.

20 Claims, 4 Drawing Sheets

METHOD OF MAKING CARBON NANOTUBE COMPOSITE MATERIALS

CROSS REFERENCE TO RELATED APPLICATIONS

The present application for patent is related to U.S. patent application Ser. No. 13/223,672 filed Sep. 1, 2011 and entitled "Carbon Nanotube Composite Materials," which is assigned to the same assignee as that of the present invention and fully incorporated herein by reference. The present application claims priority to prior provisional U.S. Patent Application Ser. No. 61/411,308 originally filed Nov. 8, 2010 entitled "NANOTUBE SURFACE FUNCTIONALIZATION EFFECTS IN BLENDED MULTI-WALLED CARBON NANOTUBE/PVDF COMPOSITES" from which benefit is claimed.

STATEMENT REGARDING FEDERALLY SPONSORED RESEARCH OR DEVELOPMENT

The United States Government has a paid-up license in this invention and the right in limited circumstances to require the patent owner to license others on reasonable terms as provided for by the terms of contract DE-AC04-94AL85000 awarded by the U.S. Department of Energy to Sandia Corporation.

BACKGROUND OF THE INVENTION

The present invention relates to a method of making carbon nanotube composite materials and, more particularly, to a method of making blended composite polymeric material with both un-functionalized and hydroxylated carbon nanotubes.

Carbon nanotube (CNT) filled polymer nanocomposites are promising materials for a variety of applications, with enhanced mechanical, thermal and electronic properties imparted to the polymer matrix by mixing even minute amounts (<0.1 wt %) of CNTs. These polymer composite materials containing carbon-based fillers (carbon nanotubes) can be useful because of their potential for high conductivity, low weight and ease of processing. Of particular interest is the formation of CNT networks in a polymer film to create electrically conductive pathways. Useful would be an efficient method for imparting the high electrical conductivity of individual CNTs to a composite material. For a network of CNTs to form an electrically conductive path requires a minimum overlap of tubes, which is otherwise known as the percolation threshold. Van der Waals interactions between CNTs leads to aggregation and bundling into large clusters, which is a fundamental challenge to achieving maximum dispersion and conductivity for a given amount of CNTs. To compensate for this aggregation and achieve a conductive pathway through a filled polymer matrix, the fraction of CNTs is generally increased beyond the minimum fill required for a theoretical percolation network. One method to increase the dispersion of CNTs in various matrix materials is through pre-treatment functionalization methods and mixing procedures to obtain enhanced properties at lower fill percentages. Generally, the increased dispersion from functionalization of CNT outer walls comes at the expense of carbon-carbon bond cleavage and reduction in the π-bonding network, which leads to a loss of electrical conductivity. Another CNT dispersion enhancement strategy is to utilize small molecule and oligomeric additives that have high affinity for the CNT surface and can wrap around tubes to reduce aggregation via non-covalent functionalization. This strategy has proven highly useful at maintaining the desired charge transport properties of CNTs while enhancing dispersion to form percolated networks at lower fill percentages.

BRIEF DESCRIPTION OF THE DRAWINGS

The accompanying drawings, which form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
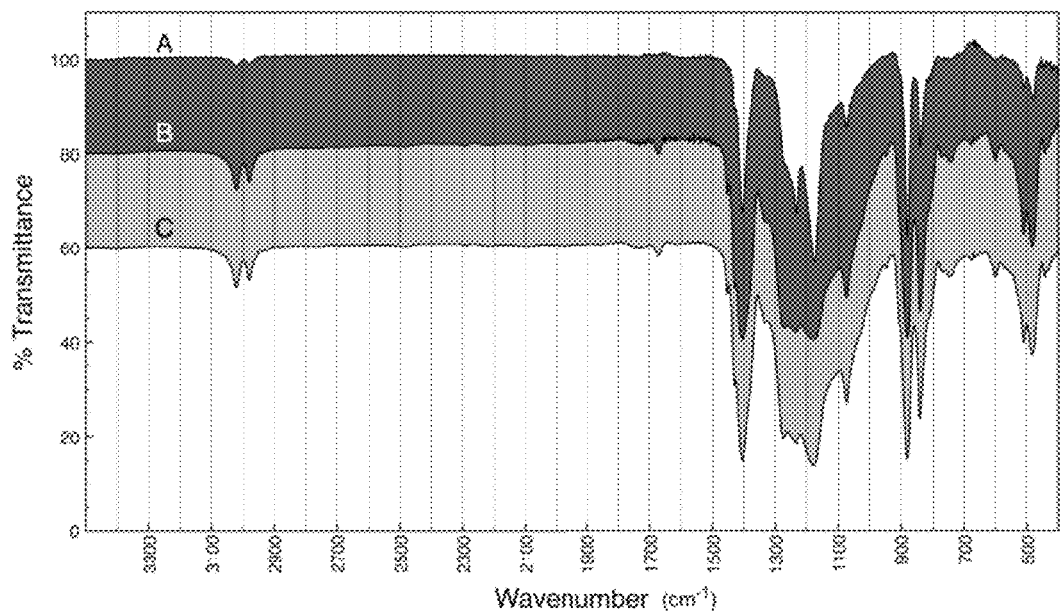
FIG. 1A shows FT-IR spectra of PVDF.
FIG. 1B shows FT-IR spectra of PVDF with 1 wt % multi-wall carbon nanotubes (MWCNT)
FIG. 1C shows FT-IR spectra of PVDF with 1 wt % hydroxylated multi-wall carbon nanotubes (HO-MWCNT).
Figure 2:
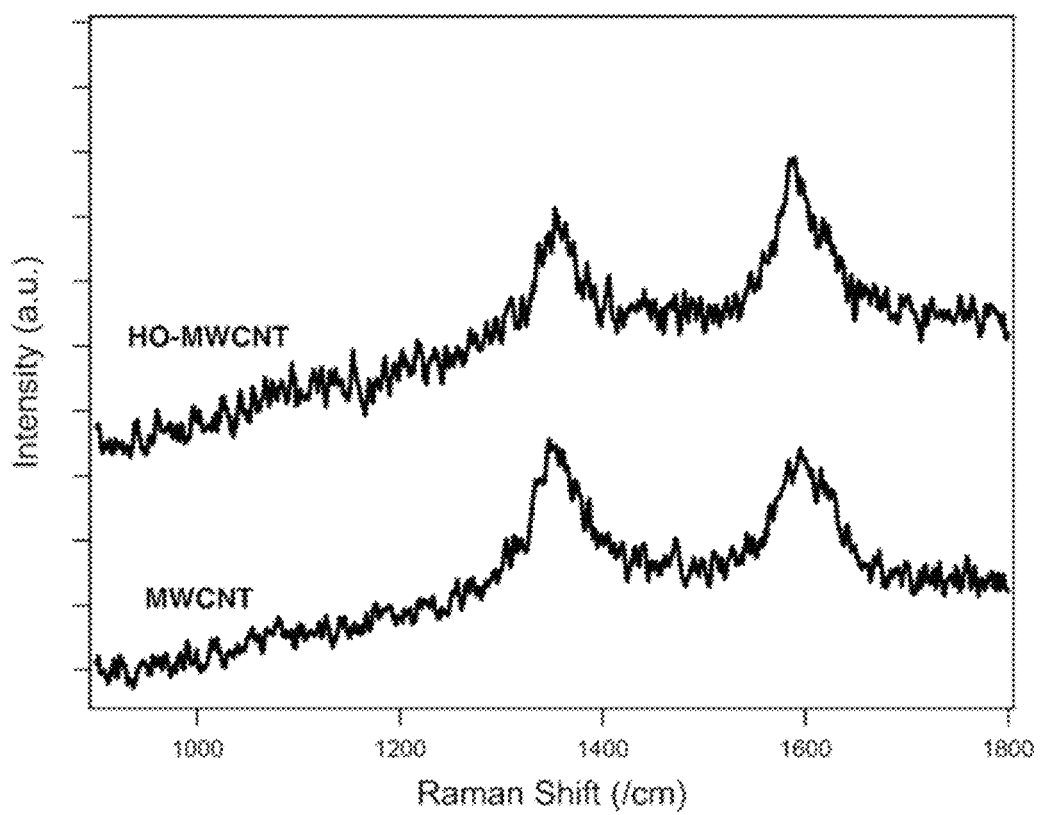
FIG. 2 shows Raman spectra of 1 wt % HO-MWCNT in PVDF and 1 wt % MWCNT in PVDF.
Figure 3:
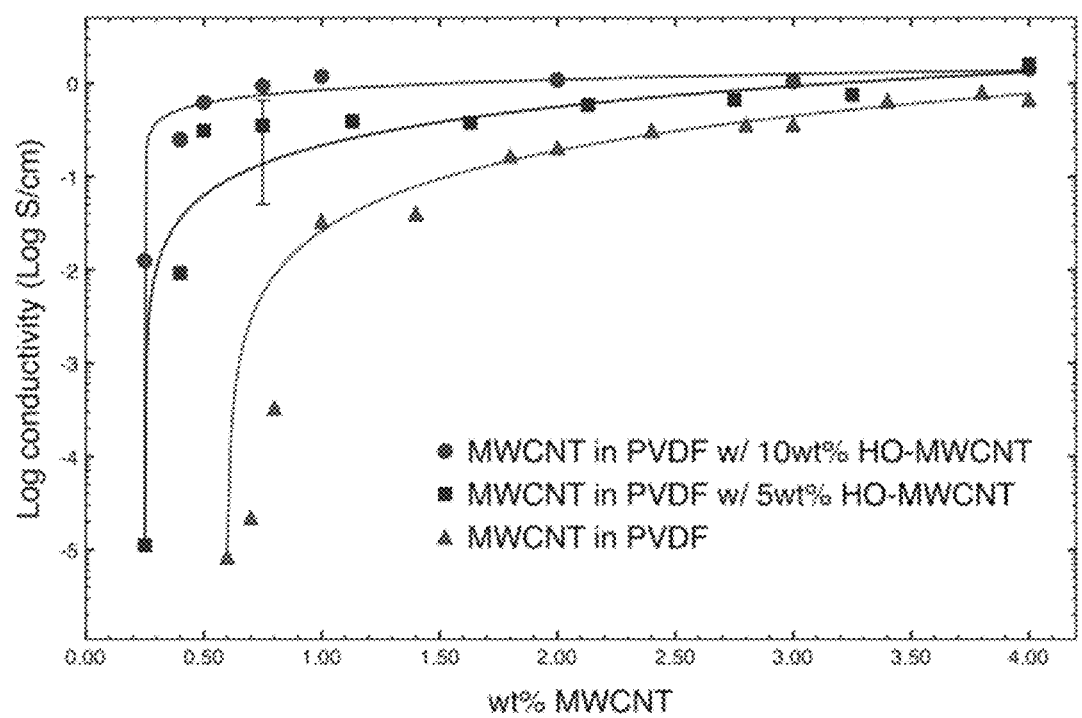
FIG. 3 shows the change in conductivity with increasing concentration of MWCNT at three concentrations of HO-MWCNT.

One embodiment of the present invention is a method of making a composite material consisting essentially of a vinyl thermoplastic polymer, un-functionalized carbon nanotubes and hydroxylated carbon nanotubes dissolved in a solvent (O'Bryan, G., Yang, E. L., Zifer, T., Wally, K., Skinner, J. L, and Vance, A. L., Journal of Applied Polymer Science, 2011, 120, 1379-1384, herein incorporated by reference). The material is also referred to as a nanocomposite material as carbon nanotubes are used to fill the polymeric material. The formed solution can be cast onto a substrate to make thin films with enhanced conductivity properties.

The composite material is a binary mixed-fill system employing hydroxyl-functionalized (hydroxylated) carbon nanotubes (HO-CNTs) with un-functionalized carbon nanotubes (CNTs) in a vinyl thermoplastic polymer matrix. The vinyl thermoplastic polymer matrix includes but is not limited to poly(vinylidene fluoride) (PVDF), polypropylene (PP) compounds, polyethylene (PE) compounds, polystyrene (PS) compounds, polyacrylate (PA) compounds, polyvinylchloride (PVC) compounds, polyvinyl acetate (PVA) compounds, and copolymers thereof. The polymer is dissolved in a solvent capable of dissolving the polymer and CNTs, including but not limited to dimethylformamide (DMF), dimethylacetamine, and methylpyrrolidone solvents. These solvents can optionally be mixed with up to approximately 70 wt % of another solvent including acetone, chloroform, chlorobenzenes, toluene, xylenes, tetrahydrofuran, 2-methyltetrahydrofuran, ethyl acetate, and cyclopentyl methyl ether. The concentration of the polymer can be up to the solubility limit of the polymer in the solvent system chosen.

For both the un-functionalized and hydroxyl-functionalized CNTs, either single wall carbon nanotubes (SWCNT) or multi-wall carbon nanotubes (MWCNT) can be used. Single-walled nanotubes consist of a single graphite sheet wrapped into a cylindrical tube. Multi-walled nanotubes are an array of such single-walled nanotubes that are concentrically nested. The single-walled CNTs can be either metallic or semiconducting, depending on the sheet direction about which the graphite sheet is rolled to form a nanotube cylinder. In general, the electronic properties of multi-walled CNTs are similar to those of single-walled CNTs. The concentration of the un-functionalized can vary from greater than 0 wt % up to approximately 30 wt % (calculated as weight percent of the composite solid material without including the solvent) and the concentration of the hydroxyl-functionalized CNTs can vary from greater than 0 wt % up to approximately 40 wt % (calculated as weight percent of the composite solid material without including the solvent).

To aid in dispersion other additives can optionally be added to the solution. Typical additives include, but are not limited to, surfactants, including a fluorosurfactant such as Zonyl® UR (Dupont) and non-ionic surfactants such as Triton® X-100 (Dow), and compounds such as polystyrene sulfonate and polyethylene glycol. Typical concentrations range up to 10 wt %.

In one embodiment, PVDF was chosen as the matrix material due to its excellent coating properties, such as high durability, solvent resistance, and low creep, while maintaining solution processability for casting thin films of composite materials. Herein, as shown in subsequent examples, blending hydroxylated MWCNTs with untreated MWCNTs in a PVDF nanocomposite leads to enhanced electrical characteristics. The enhanced electrical properties are observed at lower fills of untreated MWCNT compared to a non-blended (strictly untreated MWCNT/PVDF composites) system. The benefit of blending functionalized HO-MWCNT into MWCNT/PVDF composites is observed from the electrical conductivity measurements of cast composite films. A power law fit of the experimental data reveals a decrease in the percolation threshold with an increase in the saturation conductivity. The percolation threshold was decreased from 0.49 wt % to 0.25 wt %, with an increase in conductivity at the percolation threshold with only half the concentration of MWCNT (ternary composite containing 10 wt % HO-MWCNT in PVDF) compared to the binary composite without functionalized MWCNT. The improved electrical properties point towards an improved dispersion of MWCNT at lower fill percentages leading to a faster approach to the saturation conductivity observed in this system.

Carbon nanotubes can be blended into a polymer matrix via melt, extrusion, or solution mixing. In one embodiment, the invention is a method for preparing the solution comprising the vinyl thermoplastic polymer with the mix of both the un-functionalized CNTs and hydroxylated CNTs. In one specific embodiment to produce thin films of the polymer nanocomposite materials, a solution-based process is used wherein a spin, dip, brush, spray coating or drop casting method allows formation of thin films on a substrate. To prepare samples, the vinyl thermoplastic polymer, such as PVDF, is first dissolved into a solvent, such as a dimethylformamide (DMF) solvent or dimethylacetamine solvent. In another embodiment, the solvent N-methylpyrrolidone (NMP) was used, which creates excellent dispersions of CNT/polymer composites but is much more difficult to remove by evaporation after casting. Optionally, heating and agitation can be utilized to aid in the dissolution. The polymer can be added at any concentration up to the limit of solubility of the polymer in the solvent. Optionally, additives, such as the surfactants or other additive compounds noted previously, can be mixed into the solvent. Both un-functionalized CNTs (at concentrations up to approximately 30 wt %) and hydroxylated CNTs (at concentrations up to approximately 40 wt %) are blended into the polymer solution with ultrasonication optionally used to aid in dispersing the CNTs into the polymer. Poor dispersion can cause the presence of large entanglements of nanotubes that reduces the value of electrical conductivity and also yields inferior mechanical properties. Sonication times were kept brief (approximately 10 min) to minimize tube degradation. Solutions prepared in this manner were stable for about several months. The polymer matrix, hydroxylated CNTs, un-functionalized CNTs and the optional additives can be mixed in the solvent in any order desired.

To produce thin films (generally of less than approximately 50 μm to about 100 μm), after ultrasonication, the solutions were drop-casted onto glass plates at least a portion of the solvent removed; the solvent removal can be performed at any desired environmental conditions, including both elevated temperature or non-ambient pressure, such as in a pre-heated vacuum oven (70° C.) for removal of solvent. Thicker films can be optionally made by variation of the solution viscosity or by repeating the casting procedure of the solution onto the coated substrate. After drying, sample strips were submersed in liquid nitrogen and immediately fractured to reveal accurate cross-sectional representations. The composite films were then imaged on a cross-sectional puck at an accelerating voltage of 15 kV.

In one embodiment, solutions of 1 wt % MWCNT and 1 wt % HO-MWCNT in PVDF were examined by FT-IR spectroscopy to determine interaction effects with the matrix. Undoped PVDF, FIG. 1A, has characteristic peaks at 445, 512, 840, and 1175 cm$^{-1}$ corresponding to the β crystalline phase of PVDF. No peaks were detected that correspond to the α crystalline PVDF phase, consistent with reports of PVDF crystal phases evolving from DMF solutions. PVDF films doped with 1 wt % MWCNT and 1 wt % HO-MWCNT produced virtually identical spectra. Enhancement of the β crystalline phase of PVDF was observed in both nanocomposite samples with peaks at 512 cm$^{-1}$ and 840 cm$^{-1}$ increasing most dramatically. In the case of PVDF with 1 wt % HO-MWCNT (cf. FIG. 1B) no broad signal was detected between about 3200 cm$^{-1}$ to about 3600 cm$^{-1}$, a typical absorption for most hydrogen bonded hydroxyl groups. Casting hydroxy functionalized MWCNT without PVDF and examining the material by FT-IR also did not yield the expected H-O signal. Even still, the dispersion of HO-MWCNT in DMF and PVDF solutions remained much higher than un-functionalized MWCNT.

Solutions of 1 wt % MWCNT and 1 wt % HO-MWCNT in PVDF were also examined by Raman spectroscopy. Two peaks were observed at 1350 cm$^{-1}$ and 1590 cm$^{-1}$. The first peak, at 1350 cm$^{-1}$, corresponds to the disorder mode or D band and the second peak, at 1590 cm$^{-1}$, corresponds to the graphitic tangential mode or G band. In SWCNTs, an increase in the D to G band intensity is usually used to signify functionalization of the tubes. The change is attributed to defect sites forming during the transformation of carbon atoms from sp$^2$ to sp$^3$ hybridization. In the Raman spectra collected in our samples however, the ratio of D to G band intensities appears to decrease for the sample consisting of HO-MWCNTs as compared to the sample with un-functionalized MWCNTs. The explanation is that the sp$^2$ to sp$^3$ hybridization only occurs in the outermost nanotubes therefore the change in intensity of the D band relative to the G band becomes less significant. Furthermore, the D band can actually be seen to decrease in functionalized samples due to removal of defect laden amorphous carbon during the functionalization process.

Differential scanning calorimetry (DSC) was performed on composites of PVDF to determine crystallinity and observe thermal behavior in polymer-MWCNT composites.

No decrease in the polymer melt temperature ($T_m$) was observed in either nanocomposite, but a change in the polymer crystallinity reveals an association difference between the functionalized and non-functionalized nanotubes and the matrix material. The decreased crystallinity of the non-functionalized nanotube PVDF composite is most likely the result of increased crystallite nucleation, consistent with the decrease in crystallinity observed in other PVDF CNT composite systems. However, the HO-MWCNT PVDF nanocomposite has virtually the same crystallinity as the pure PVDF material indicating a favorable CNT polymer interaction and therefore a decrease in the number of nucleation sites.

In another embodiment, solution samples consisting of 2 wt % MWCNT, a mixture of 1 wt % MWCNT and 1 wt % HO-MWCNT, and 2 wt % HO-MWCNT were prepared for scanning electron microscope (SEM) analysis. After ultrasonication, the solutions were immediately drop casted onto glass plates and placed in a pre-heated vacuum oven (70 C) for removal of solvent. After drying, sample strips were submersed in liquid nitrogen and immediately fractured to reveal accurate cross-sectional representations. The composite films were then imaged on a cross-sectional puck at an accelerating voltage of 15 kV.

The most noticeable difference between the three samples was film thickness, namely 44 μm, 20 μm, and 12 μm for the 2 wt % MWCNT sample, mix of 1 wt % MWCNT and 1 wt % HO-MWCNT, and 2 wt % HO-MWCNT respectively. The final film thickness was repeatable for a given mix-fill concentration, and is dependent upon solution viscosity (on the order of 100 CP for starting PVDF solutions) which changes with fill ratio, polymer molecular weight and concentration. Since the total MWCNT weight percent of the samples was the same, the difference in thickness was attributed to the makeup and surface functionalization of the tubes which provides an increased interaction with solvent and matrix materials leading to enhanced dispersion. Further experiments revealed that film thickness was largely dependent on weight percentage of HO-MWCNT. Magnified images of the cross-sectional plane of the composites reveal a dense forest of tubes within the polymer. Qualitative comparison of images suggests an apparent decrease in MWCNT density corresponding to direct decrease in the MWCNT content. No other apparent differences between the three compositions could be detected at this level.

Initial studies to increase the dispersion of MWCNTs in PVDF revealed that blending mix-fill systems comprised of functionalized and un-functionalized MWCNTs resulted in a slight decrease in sheet resistance. A series of electrical percolation experiments were conducted to find an optimum blend of oxidized and untreated MWCNT in PVDF. Films of nano-composites were prepared via drop casting from solution. Circular discs of composite material with a diameter of 4 cm Clearly, the ability of MWCNT to form an electrically conductive network is aided by the presence of hydroxylated CNTs in a mix-fill system with the un-functionalized CNTs. It should be noted that PVDF composites consisting of only HO-MWCNTs exhibited strictly insulating electrical properties; therefore, the measured conductivities of the mix-fill materials were negligibly affected by current flow through the additional HO-MWCNTs. It is possible that the dispersion of MWCNTs in a mix-fill system is much greater and aggregation of the tubes during film drying is most likely decreased. Electrical percolation in polymer nanocomposites with CNT's as the filler material has been examined extensively, and yet improving dispersion and electron transport through nanotube contact invariably remains a challenge in homogeneous polymer nanocomposites (as opposed to segregated networks).

The behavior of the mixed-fill composites was further examined by fitting the electrical conductivity data to a power law dependence and extracting the characteristic parameters. Traditional percolation theory states that conductivity of the composites can be described by the equation: $\sigma(x)=a(x-b)^n$, where $\sigma$ is electrical conductivity, a is the saturation conductivity, b is the percolation threshold, and n is the critical exponent. The saturation conductivity of the system should theoretically approach the conductivity of the carbon nanotubes. The percolation threshold is the point at which the system becomes conductive and has been found to be a function of filler aspect ratio. And the critical exponent is a function of the overall system, including fabrication of composites and resulting aggregation characteristics. The curve fits were based on an unconstrained nonlinear minimization of the sum of squared residuals with respect to the three parameters. The extracted parameters are shown in Table 1 below.

TABLE 1

Extracted parameters for power law curve fit to conductivity data

| Parameter | 0 wt % HO-MWCNT | 5 wt % HO-MWCNT | 10 wt % HO-MWCNT |
|---|---|---|---|
| a | 0.11 | 0.30 | 0.92 |
| b | 0.49 | 0.25 | 0.25 |
| n | 1.58 | 1.13 | 0.30 |

The percolation threshold with no oxidized MWCNTs is seen to occur at 0.49 wt % MWCNT. This threshold dramatically decreased to 0.25 wt % MWCNT when the same MWCNT were mixed into solutions containing 5 wt % HO-MWCNT. The amount of MWCNTs needed to form a conductive network through the matrix in this case was nearly half as much. Not only was the percolation lower but the overall electrical conductivity of the samples was increased as well. Increasing the concentration of HO-MWCNT from 5 wt % to 10 wt % resulted in a percolation threshold that was approximately the same as the threshold observed in 5 wt % HO-MWCNT system. However, comparing the lowest fractions of MWCNT (0.25 wt %), the electrical conductivity in the 10 wt % HO-MWCNT was three orders of magnitude higher than in the 5 wt % HO-MWCNT. Finally, there was a significant change in the critical exponent with the addition of functionalized MWCNTs from around 3 to 1. Since the fabrication method of all composites was the same, this suggests that aggregation of nanotubes was decreased in the systems with functionalized tubes.

Figure 4:
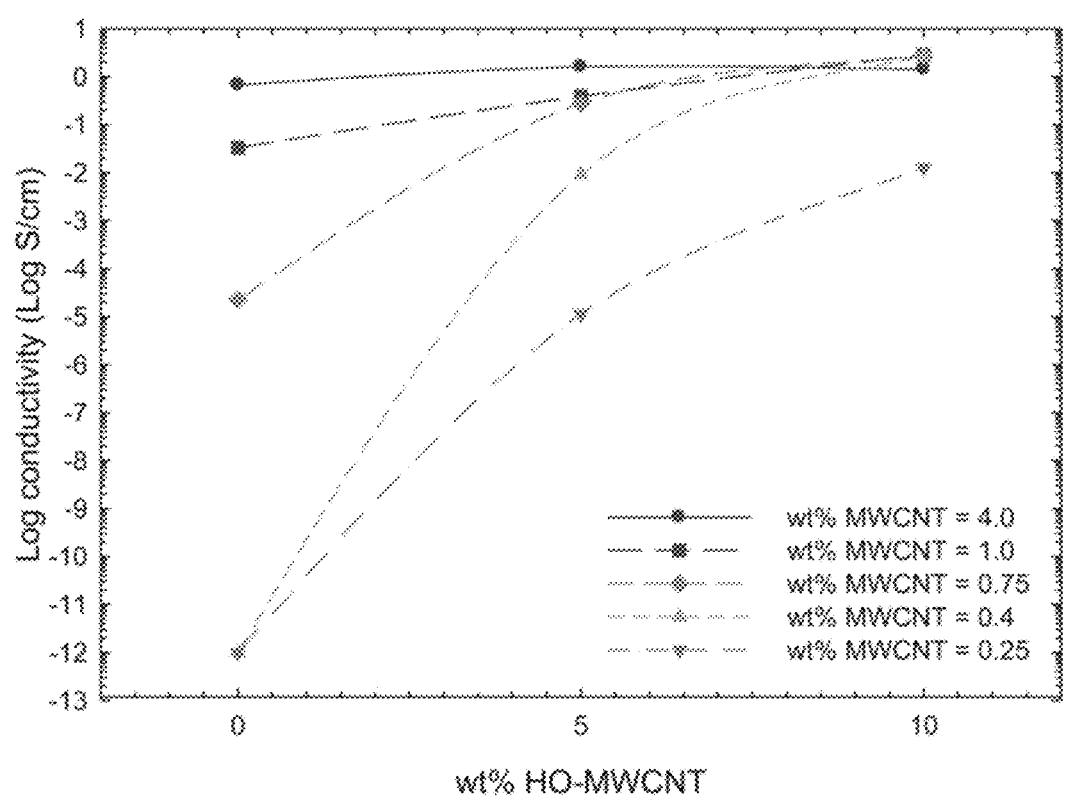
FIG. 4 shows the change in conductivity with increasing concentration of HO-MWCNT at varying concentrations of un-functionalized MWCNT.

FIG. 4 illustrates the change in conductivity with increasing concentration of HO-MWCNT at varying concentrations of un-functionalized MWCNTs. For the composites containing 0.25 wt % and 0.4 wt % with no HO-MWCNTs, there is no measurable conductivity and is plotted at $10^{-12}$ S/cm to reflect the limitations of the measurement device. As the amount of MWCNTs is increased, the benefits of the addition of functionalized MWCNTs decreases. At around 4.0 wt % MWCNT, the effect appears negligible. At this loading, it is likely that there is sufficient amount of MWCNTs present to make aggregation a nonissue. Furthermore, the boost in conductivity from 0 wt % to 5 wt % HO-MWCNT is more significant than from 5 wt % to 10 wt % HO-MWCNT suggesting there is some saturation limit to the benefits of incorporating HO-MWCNT.

EXAMPLES

Materials and Sample Preparation

Multi-wall carbon nanotubes (MWCNT) were purchased in powder form from Cheap Tubes, Inc., with a purity of >95%, a tube diameter range of about 8 nm to about 15 nm and a length of about 10 μm to about 50 μm. The MWCNT were purified by washing with concentrated hydrochloride acid followed by a rinse with deionized water and a subsequent drying step in an oven at 120° C. for 18 hours. Hydroxy functionalized MWCNT (HO-MWCNT) purchased from Sun Innovations ($Sun_{nano}$) in powder form, with a purity of 95%, a tube diameter range of about 30 nm to about 50 nm and a length of about 10 μm to about 20 μm were used as received. Multi-wall CNTs were chosen for use in the examples herein because of the ease of availability; single wall CNTs could optionally been used. PVDF in pellet form, purchased from Sigma-Aldrich, had a weight average molar mass ($M_w$) of 180 kDa and a number average molar mass ($M_n$) Of 71 kDa.

Instrumentation.

Ultrasonication was performed with a Sonics 750 W Vibra Cell ultrasonicating processor with a ¼ in. microtip attachment operating at 35% amplitude. Microscopy was performed on a Hitachi Scanning Electron Microscope S-4500 with an accelerating voltage of 15 kV. Electrical resistivity measurements were performed with a Jandel RM3-AR I-V source-meter using a Guardian SRM-232-10 four-point sheet resistance probe with a 62.5 mil spacing. A 100Ω resistor supplied by the manufacturer was used to calibrate the instrument. Fourier-transform infrared (FT-IR) spectroscopy was performed on a Varian Scimitar Series 800; solutions of composite material were cast onto transparent KBr plates for measurement. Raman spectroscopy was performed using the 532 nm line of a Nd:YAG laser as the excitation source. The total power incident on the substrate surface was approximately 2 mW and the laser spot size was approximately 650 nm in diameter. Spectra were collected for an interval of 60 seconds. Differential scanning calorimetry (DSC) was performed on a Mettler Toledo $DSC822^e$ heating from room temperature to 200° C. at a rate of 2° per min in a 40 μL aluminum pan with a blank pan for reference.

Example 1

Preparation of Carbon Nanotube Composite Materials in a DMF Solvent

Solutions of PVDF in dimethylformamide (DMF) were prepared by heating pre-weighed pellets of PVDF in DMF in a water bath at 80° C. with mechanical stirring until the pellets completely dissolved. Nanotubes were weighed on an analytical balance, placed directly in PVDF solution, and vortexed to premix the solution. In various embodiments, MWCNTs at concentrations varying from approximately 0.25 wt % up to 4 wt % were used in the formulations and HO-MWCNTs at concentrations varying from greater than 0 wt % up to approximately 10 wt % were used in the formulations. Optionally, the vinyl thermoplastic polymer and CNTs can be mixed in any order in the solvent.

Example 2

Preparation of Carbon Nanotube Composite Materials in a Methylpyrrolidone Solvent Solutions of PVDF in N methyl-2-pyrrolidone were prepared by heating pre-weighed pellets of PVDF in DMF in a water bath at 80° C. with mechanical stirring until the pellets completely dissolved. Nanotubes were weighed on an analytical balance, placed directly in PVDF solution, and vortexed to premix the solution. Optionally, the vinyl thermoplastic polymer and CNTs can be mixed in any order in the solvent.

Example 3

Preparation of Thin Film Composite Materials

Solutions of PVDF in dimethylformamide were prepared by heating pre-weighed pellets in DMF in a water bath at 80° C. with mechanical stirring until the pellets completely dissolved and adding desired quantities of un-functionalized CNTs and hydroxylated CNTs. In one embodiment, a solution was formulated with a mixture of 1 wt % MWCNT and 1 wt % HO-MWCNT; one control solution containing 2 wt % MWCNT and another control solution containing 2 wt % HO-MWCNT were also prepared. Other various embodiments used MWCNT concentrations from 0.25 wt % up to 4 wt % and HO-MWCNT concentrations from greater than 0 wt % up to 10 wt %. After ultrasonication, the solutions were immediately drop casted onto glass plates and placed in a pre-heated vacuum oven (70 C) for removal of solvent. The solution was chilled in an ice bath, and an ultrasonicating probe tip was placed in the solution for sonication at a power output of 14 W for 10 minutes. The sonicated solution was drop casted on a substrate, such as a glass plate, and dried in a vacuum oven at 70° C. until the solvent was completely removed and the composite surface was no longer glossy (about 10 to about 15 minutes). After cooling to room temperature, samples for resistivity measurements were cut on the glass plate into 4-cm-diameter circles and then peeled off. SEM analyses gave thin film thickness of 44 μm, 20 μm, and 12 μm for the 2 wt % MWCNT sample, mix of 1 wt % MWCNT and 1 wt % HO-MWCNT, and 2 wt % HO-MWCNT respectively.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

We claim:

1. A method of making a composite material, comprising:
   dissolving a vinyl thermoplastic polymer, un-functionalized carbon nanotubes and hydroxylated carbon nanotubes in a solvent to make a solution; and
   removing at least a portion of the solvent.

2. The method of claim 1, wherein said solution is cast onto a surface prior to the step of removing at least a portion of the solvent to form a film.

3. The method of claim 1, wherein said vinyl thermoplastic polymer is selected from the group consisting of poly(vinylidene fluoride), a polypropylene compound, a polyethylene compound, a polystyrene compound, a polyacrylate compound, a polyvinylchloride compound, a polyvinyl acetate compound, and copolymers thereof.

4. The method of claim 1, wherein said un-functionalized carbon nanotubes are selected from the group consisting of un-functionalized single-wall nanotubes and un-functionalized multi-wall nanotubes.

5. The method of claim 1, wherein said hydroxylated carbon nanotubes is selected from the group consisting of hydroxylated single-wall nanotubes and hydroxylated nanotubes.

6. The method of claim 1, wherein said un-functionalized carbon nanotubes comprise a concentration of greater than 0 wt % and up to approximately 30 wt %.

7. The method of claim 1, wherein said hydroxylated carbon nanotubes comprise a concentration of greater than 0 wt % and up to approximately 40 wt %.

8. The method of claim 1, wherein said solvent is selected from the group consisting of dimethylformamide, dimethylacetamine, and methylpyrrolidone solvents.

9. The method of claim 8, wherein said solvent is mixed with up to approximately 70 wt % of a second solvent selected from the group consisting of acetone, chloroform, chlorobenzenes, toluene, xylene, tetrahydrofuran, 2-methyltetrahydrofuran, ethyl acetate, and cyclopentyl methyl ether.

10. The method of claim 2, wherein said film has a percolation threshold of less than approximately 0.5%.

11. The method of claim 2, wherein said film has a conductivity of greater than 0.01 S/cm.

12. The method of claim 2, wherein said solution is cast onto a surface by a method selected from the group consisting of spin, dip, brush, spray coating or drop casting.

13. The method of claim 1, wherein said dissolving a vinyl thermoplastic polymer, un-functionalized carbon nanotubes and hydroxylated carbon nanotubes in a solvent to make a solution is aid by a method selected from heating and agitation.

14. The method of claim 1, wherein said un-functionalized carbon nanotubes have a concentration of greater than 0 wt % and less than approximately 4 wt %, and said hydroxylated carbon nanotubes have a concentration of greater than 0 wt % and less than approximately 10 wt % to produce a film with a conductivity of greater than $10^{-5}$ S/cm.

15. The method of claim 1, wherein an additive is added to the solvent.

16. The method of claim 14, wherein said additive is selected from the group consisting of a surfactant, polystyrene sulfonate and polyethylene glycol.

17. The method of claim 15, wherein said additive is added at a concentration of less than 10 wt %.

18. A method of making a composite material, comprising:
dissolving a polymer, un-functionalized carbon nanotubes and hydroxylated carbon nanotubes in a solvent to make a solution; and
removing at least a portion of the solvent;
wherein said un-functionalized carbon nanotubes comprise a concentration of greater than 0 wt % and up to approximately 30 wt %; and
wherein said hydroxylated carbon nanotubes comprise a concentration of greater than 0 wt % and up to approximately 40 wt %.

19. The method of claim 18, wherein said un-functionalized carbon nanotubes are selected from the group consisting of un-functionalized single-wall nanotubes and un-functionalized multi-wall nanotubes.

20. The method of claim 18, wherein said hydroxylated carbon nanotubes is selected from the group consisting of hydroxylated nanotubes and hydroxylated multi-wall nanotubes.

* * * * *